US012583779B2

(12) United States Patent     (10) Patent No.:   US 12,583,779 B2

Richardson     (45) Date of Patent:    Mar. 24, 2026

(54) PRODUCTION OF POTABLE WATER USING CHEMICALLY FORCED PRECIPITATION

(71) Applicant: Robert George Richardson, Shingleton, CA (US)

(72) Inventor: Robert George Richardson, Shingleton, CA (US)

( * ) Notice: Subject to any disclaimer, the term of this patent is extended or adjusted under 35 U.S.C. 154(b) by 231 days.

(21) Appl. No.: 18/127,529

(22) Filed: Mar. 28, 2023

(65) Prior Publication Data

US 2023/0234869 A1     Jul. 27, 2023

Related U.S. Application Data

(60) Continuation-in-part of application No. 17/750,331, filed on May 21, 2022, now Pat. No. 11,857,920, which is a division of application No. 16/773,292, filed on Jan. 27, 2020, now abandoned.

(60) Provisional application No. 63/324,266, filed on Mar. 28, 2022, provisional application No. 62/797,468, filed on Jan. 28, 2019.

(51) Int. Cl.

| | |
|---|---|
| *B01F 25/31* | (2022.01) |
| *B01F 25/312* | (2022.01) |
| *C02F 1/00* | (2023.01) |
| *C02F 1/04* | (2023.01) |
| *C02F 1/36* | (2023.01) |
| *C02F 1/38* | (2023.01) |
| *C02F 1/44* | (2023.01) |
| *C02F 1/54* | (2023.01) |
| *C02F 1/66* | (2023.01) |
| *C02F 9/00* | (2023.01) |
| *C02F 103/08* | (2006.01) |

(52) U.S. Cl.

CPC ............. *C02F 9/00* (2013.01); *B01F 25/312* (2022.01); *C02F 1/008* (2013.01); *C02F 1/004* (2013.01); *C02F 1/04* (2013.01); *C02F 1/38* (2013.01); *C02F 1/445* (2013.01); *C02F 1/54* (2013.01); *C02F 1/66* (2013.01); *C02F 2103/08* (2013.01); *C02F 2209/02* (2013.01); *C02F 2209/06* (2013.01); *C02F 2209/10* (2013.01); *C02F 2209/40* (2013.01); *C02F 2303/18* (2013.01)

(58) Field of Classification Search

None

See application file for complete search history.

*Primary Examiner* — Daniel Berns

(57) ABSTRACT

The disclosure provides two integrated methods for the production of potable water from seawater or other brackish waters using chemical forced precipitation. The process is closed loop. It recycles process reactants and produces commercially valuable potable water and salts. The technology uses a computer software method of process variable control that maintains the chemical forced precipitation process salt, solvent, and water concentrations as required to optimize water production. The process fortuitously requires less energy than other water production processes and can utilize solar hot water heating or waste heat from other combustion and seawater for heating and cooling energy sources.

6 Claims, 4 Drawing Sheets

PRODUCTION OF POTABLE WATER USING CHEMICALLY FORCED PRECIPITATION

CROSS REFERENCE TO RELATED APPLICATIONS

This application claims the benefit of priority under 37 U.S.C. § 119(e) to U.S. Provisional Application No. 63/324, 466, filed on Mar. 28, 2022, and titled: "FORWARD OSMOSIS WITH CHEMICALLY FORCED PRECIPITATION DRAW RECOVERY SYSTEM;" and the benefit of priority under 37 U.S.C. § 120 to U.S. patent application Ser. No. 17/750,331, filed on May 21, 2022, titled: "CHEMICAL SEQUESTERING OF $CO_2$, $NO_x$ AND $SO_2$," which is a divisional application of U.S. patent application Ser. No. 16/773,293, filed on Jan. 27, 2020, titled: "CHEMICAL SEQUESTERING OF $CO_2$, $NO_x$ AND $SO_2$," now U.S. Pat. No. 11,369,918 B2, which issued on Jun. 28, 2022, and the benefit of priority under 37 U.S.C. § 119(e) to the U.S. Provisional Application No. 62/797,468, filed on Jan. 28, 2019, and titled: "CHEMICAL SEQUESTERING OF $CO_2$ USING CLOSED LITHIUM TECHNOLOGY," the disclosure of each of which is hereby incorporated by reference in their entirety for all purposes.

TECHNICAL FIELD OF THE INVENTION

The present disclosure generally relates to improving water quality. More particularly, the disclosure provides methods and processes for producing potable drinking water from seawater or other saline aquifers by utilizing a closed loop chemical forced precipitation process that improves the forced precipitation product quality and quantity. The chemical forced precipitation process can be combined with forward osmosis or other processes for increased raw water filtering capability.

BACKGROUND OF THE INVENTION

Potable water, also known as drinking water, is essential for maintaining life in many organisms, including humans. Potable water can be acquired in a number of ways, among them, capturing rainwater and melting snow. Water can also be acquired by pumping from geologic aquifers and collection from artesian springs. Unfortunately, these sources are not meeting the needs of life on this planet.

Literature is replete with articles that document a potable water shortage around the world. Governments and industry contribute some effort toward solving this problem, but a solution of scale required to make a meaningful difference to the potable water shortage has not occurred anywhere on the planet with the possible exceptions of UAE and Saudi Arabia.

Some examples of the currently available technologies are described below.

Thermal Desalination and Reverse Osmosis. Boiling water is the oldest method of removing salt from water. This requires dramatically more energy than reverse osmosis the technology currently used more frequently than any other water purification process. Reverse osmosis requires 6-8 $KWh/m^3$ of potable water made. This is compared to 15-16 $KWh/m^3$ required by the most efficient distillation process (Sackinger, E.I duPonte, 1981).

Forward Osmosis vs Reverse Osmosis. In reverse osmosis, water is forced through the membrane using hydraulic pressure to overcome the natural osmotic pressure that would tend to have the water go the other direction. The higher the salinity of the feed solution used in reverse osmosis, the more pressure is needed to push the water through its membrane. This process requires high-pressure pumps that use a significant amount of energy.

Reverse osmosis also requires membranes that are suited for the high pressure or ultra-high pressure used in the process. For example, reverse osmosis generally operates at pressures between 1,000 and 1,740 psi. The pressure constraints and power requirements generally limit the concentration of salt that can be treated in the raw water to 75,000 mg/L. This level is workable for seawater but prevents reverse osmosis from handling some brine aquifers with higher salt concentrations.

Forward osmosis, on the other hand, uses natural osmotic pressure to induce the flow of water through the membrane and into a draw solution with a TDS (Total Dissolved Solids) of around 150,000 mg/L. The forward osmosis process uses of natural osmotic pressure that eliminates the need for high pressure pumps and high electrical consumption that are necessary with reverse osmosis.

The forward osmosis membranes have demonstrated unforeseen abilities to separate contaminants from water that are not possible with reverse osmosis technology. For example, on the macro scale these include plants and animals, or their body parts, and wastewater contaminants. On the smaller scale forward osmosis can remove oil up to around 50,000 ppm, large radioactive nuclei such as iodine, and minerals for example manganese and iron salts. These abilities make the forward osmosis membrane an ideal pre-filter for many processes.

A well-known issue with reverse osmosis membranes is fouling and scaling, where organic and chemical residue, oxidants, and scaling ions, build up on the membrane surface. This reduces the effectiveness of the membrane and requires frequent maintenance and backwashing. Even with backwash technology, the reverse osmosis membrane is unable to effectively handle these problems that are easily handled by forward osmosis membranes. Reverse osmosis systems are also limited in their ability to handle macro contamination described above.

The forward osmosis membrane is less sensitive to fouling and scaling issues. This reduces the need for cleaning of the membrane and extends the lifetime of the membrane. Inorganic foulants have been shown to be easier to remove from forward osmosis than reverse osmosis membranes, and forward osmosis membranes exhibited the greatest scaling resistance (Comparison of fouling propensity between reverse osmosis, forward osmosis and MD, Tow, MIT-no date).

Typically pricing and performance for forward osmosis systems only address the membrane portion of the overall system required to produce potable water, ignoring the required draw recovery system that separates the permeate from the forward osmosis draw solution brine. The energy cost associated with just the forward osmosis membrane process is reported to be 0.84 $KWh/m^3$ of product.

While there are a number of technologies with the ability to make potable water from contaminated water or seawater, all of the reported technologies require large amounts of energy. Therefore, there remains a need in the art for new and improved methods for the production of potable water.

SUMMARY OF THE INVENTION

The following detailed description is of the best currently contemplated mode of carrying out exemplary embodiments herein. The description is not to be taken in a limiting sense but is made merely for the purpose of illustrating the general principles of the exemplary embodiments herein, since the scope of the disclosure is best defined by the appended claims. Various inventive features are described below that may each be used independently of one another or in combination with other features.

Broadly, embodiments of the disclosure herein generally provide two distinctly different technical processes to precipitate a salt before it reaches its saturation point with the addition of an organic solvent: 1) without a forward osmosis membrane for pre-filtering the process water (see, FIG. 3); and 2) with a forward osmosis membrane (see, FIG. 4). These processes are described separately.

Thus, in an embodiment the disclosure provides methods for chemically precipitating salts from an aqueous solution at concentrations within their solubility range using an organic solvent(s) without a forward osmosis membrane as shown in FIG. 3, including the steps of:

regulating the process water flow to equal the rate of reclaimed water leaving the process;

filtering the process water to remove biological material;

adjusting the process water pH, as required, above 9;

injecting an organic solvent, preferably one that does not form an azeotrope with water, for example methanol, into the process water;

optimizing the precipitation by mixing the liquids with an Ultrasonic Mixer or equal (The precipitation will begin immediately after the organic solvent is added);

separating the precipitate from the supernatant liquid using a vibrating separator, for example a LAKOS® separator, or centrifuge. (The precipitate is routed to the solvent evaporator. Supernatant is routed to the solvent heating device/distillation column), and the organic solvent vapors from the solvent heating device are routed to the first condenser. When liquid organic solvent forms, it is routed to a storage container;

using a Solvent Evaporator to agitate the precipitate to aid release of organic solvents; and routing the organic solvent vapors from the Solvent Evaporator to the First Condenser, and when it becomes liquid, routing it to a Storage Container; and routing the salt from the Solvent Evaporator either to a venturi liquid mixer to re-introduce the salts into process water before being discharged back into its source or routing it to a dryer in preparation for resale.

The process equilibrium is maintained with a computer program that gathers sensor data from each aspect of the overall process and then directs changes in process flow as required to optimize the production of reclaimed water.

In another embodiment the disclosure provides methods for chemically precipitating salts from an aqueous solution at concentrations within their solubility range using an organic solvent(s) with a forward osmosis membrane as shown in FIG. 4, including the steps of:

allowing process water to enter the chamber housing a forward osmosis membrane. A portion of the water and small amount of salt pass through the membrane and dilute the forward osmosis draw solution.

regulating the process water flow entering the draw solution to equal the rate of reclaimed water leaving the process by adjusting the TDS of the draw solution;

adjusting the process water pH, as required, above 9;

injecting an organic solvent, preferably one that does not form an azeotrope with water, for example methanol. Into the process water.

optimizing the precipitation by mixing the liquids with an ultrasonic mixer or equal. The precipitation will begin immediately after the organic solvent is added.

separating the precipitate from the supernatant liquid using a vibrating separator, for example a LAKOS® separator, or centrifuge. The precipitate is routed to the Solvent Evaporator. Supernatant is routed to the solvent heating device/distillation column.

Organic solvent vapors from the solvent Heating Device/Distillation Column are routed to the First Condenser. When liquid organic solvent forms, it is routed to a Storage Container.

The Solvent Evaporator agitates the precipitate to aid release of organic solvents. The organic solvent vapors are routed to the first condenser. When it becomes liquid, it is routed to a Storage Container. The salt is routed either to a Venturi Liquid Mixer to re-introduce the salts into forward osmosis draw solution or routed to a Dryer in preparation for resale.

The process equilibrium is maintained with a computer program that gathers sensor data from each aspect of the overall process and then directs changes in process flow as required to optimize the production of reclaimed water.

BRIEF DESCRIPTION OF THE DRAWINGS

The disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration, these drawings are not necessarily made to scale.

DETAILED DESCRIPTION OF EXEMPLARY EMBODIMENTS

Figure 1:
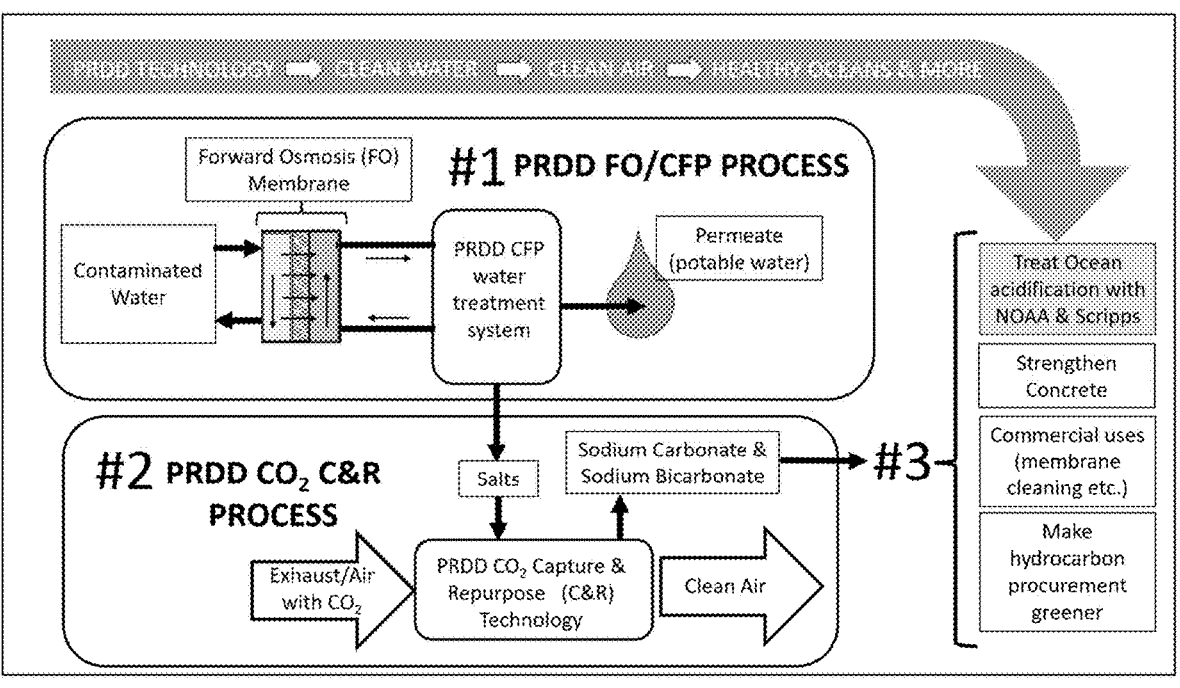
FIG. 1 illustrates an embodiment of the integration of the chemical forced precipitation process described herein with other processes.

The following description is presented to enable a person of ordinary skill in the art to make and use embodiments described herein. Descriptions of specific devices, techniques and applications, are provided only as examples. Various modifications to the examples described herein will be readily apparent to those of ordinary skill in the art, and the general principles defined herein may be applied to other examples and applications without departing from the spirit and scope of this disclosure. Thus, this disclosure is not intended to be limited to the examples described herein and shown but is to be accorded the scope consistent with the claims.

The word "exemplary" is used herein to mean "serving as an example illustration." Any aspect or design described herein as "exemplary" is not necessarily to be construed as preferred or advantageous over other aspects or designs.

Reference will not be made in detail to aspects of the subject technology, examples of which are illustrated in the accompanying drawings, wherein like reference numerals refer to like elements throughout.

The specific order or hierarchy of steps in the process disclosed herein is an example of exemplary approaches. Based upon design preferences, it is understood that the specific order or hierarchy of steps in the processes can be rearranged while remaining within the scope of the disclosure. If any accompanying method claims present elements of the various steps in a simple order, they are not meant to be limited to the specific order or hierarchy presented.

The disclosed chemical forced precipitation technology makes the production of potable water less expensive and more accessible to a thirsty world. There are a number of technologies with the ability to make potable water from contaminated water or seawater, but all of the reported technologies require large amounts of energy when compared with the combined processes of chemical forced precipitation and forward osmosis processes as described herein.

The disclosure provides chemical forced precipitation processes and methods, as a stand-alone water treatment technology and a draw recovery system when paired with a forward osmosis membrane.

Chemical forced precipitation does not have anti-fouling and scaling issues because it does not use membranes. This process distinction gives chemical forced precipitation a dramatic advantage over reverse osmosis and other membrane based technologies.

The chemical forced precipitation process is also not limited by process temperatures that are beyond the working range for reverse osmosis and other membrane systems. This process also has a lower capital cost than reverse osmosis technology. The power requirement of the chemical forced precipitation process is approximately 0.9 kWh/m³ of produced clean water. This is dramatically less energy than other water treatment draw recovery systems. For example, The chemical forced precipitation uses less than 9.2% of the electrical energy required by the reverse osmosis and other membrane process.

In the integration of the chemical forced precipitation and forward osmosis technologies, the forward osmosis technology can act as a pre-filter for the chemical forced precipitation system when the untreated water is exceptionally contaminated. The energy requirement when the two are combined is approximately 1.74 KWh/m³. For comparison, this combined energy is almost 20% of the energy required by a comparably paired reverse osmosis system.

FIG. 1 illustrates an embodiment of a potential integration of the chemical forced precipitation process with other processes. The products of each sequential process are consumables of the subsequent process. For example, the salt byproduct of the chemical forced precipitation process is the chemical consumable for the $CO_2$ capture technology; and the byproducts from the $CO_2$ capture and repurpose process are ideal for the treatment of ocean acidification.

In #1, the chemical forced precipitation process creates potable water and commercially viable salts.

In #2, the salts are the only chemical consumable for the $CO_2$ capture and repurpose process.

In #2, the sodium carbonate and sodium bicarbonate byproducts of the $CO_2$ can be captured and repurposed.

In #3 uses for sodium carbonate and sodium bicarbonate are shown.

The disclosed chemical forced precipitation technology cost effectively creates potable water from a wide variety of salt infused waters and waters with other types of ionic contamination. Another fortuitous advantage of the chemical forced precipitation process is its closed loop technology that recycles process reagents and its ability to separate recycled process reagents with waste heat or solar hot water at dramatically lower temperatures than other processes.

The chemical forced precipitation technology has demonstrated the ability to remove 99.94% of salts from brine with a TDS of 150,000 mg/L and 99.9% from seawater or other brine solutions with a TDS near 35,000 mg/L, therefore it is a viable autonomous desalinization technology.

Figure 2:
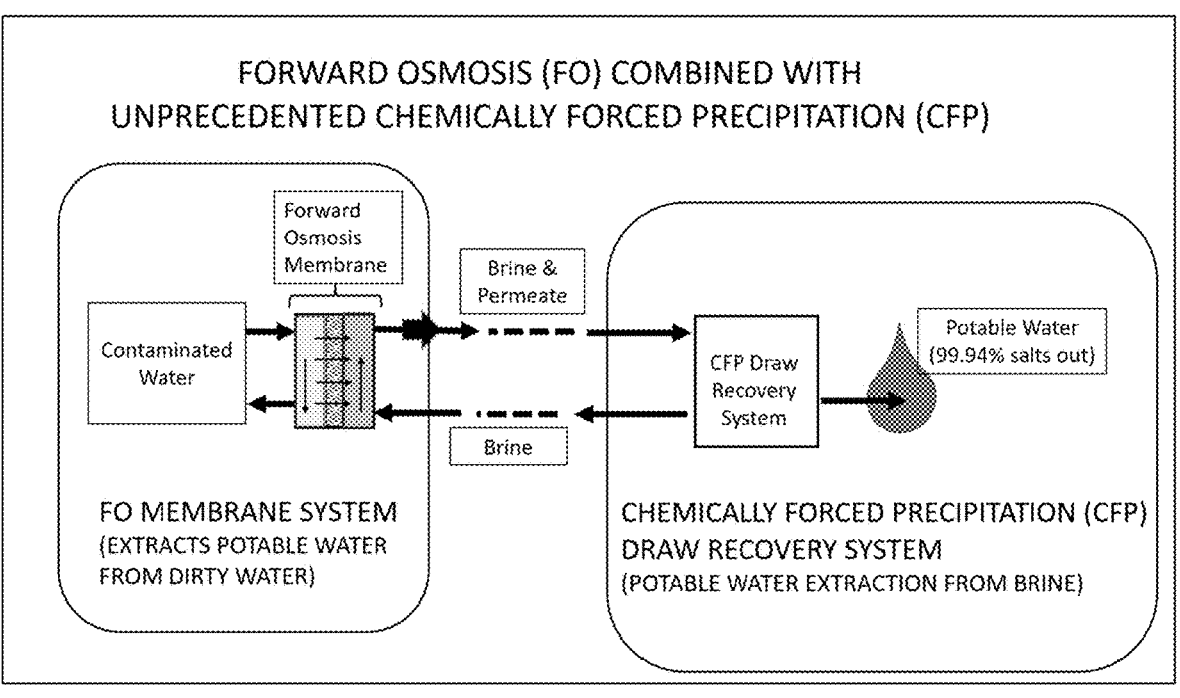
FIG. 2 illustrates an embodiment of the relationship between the chemical forced precipitation process and forward osmosis technology.

FIG. 2 illustrates the relationship between the chemical forced precipitation process and forward osmosis technology. The chemical forced precipitation process is a stand-alone water treatment process that benefits from the forward osmosis membrane's ability to filter macro and some smaller particles from the pre-treated water.

The forward osmosis membrane technology is generally not a standalone water treatment process because it requires an accompanying draw recovery technique to reconstitute the brine concentration that is diluted by passing the permeate (drinking water) through its membrane.

There were two types of draw recovery techniques to choose from before the described chemical forced precipitation was developed. (1) Thermal Processes, for example Multi-Stage Flash Distillation (MSF) and Multi-Vapor compression (MVC). (2) Membrane Based Processes, for example Nanofiltration (NF), Brackish Water Reverse Osmosis (BWRO), Seawater Reverse Osmosis (SWRO), Osmotically Assisted Reverse Osmosis (OARO), and Membrane Distillation (MD).

All of these options require dramatically more energy to produce a cubic meter of potable water than the chemical forced precipitation process described herein. The chemical forced precipitation process also equals or exceeds the best draw solution range available in the above referenced Draw Recovery technologies. Therefore, The chemical forced precipitation when combined with forward osmosis as a pre-filter, has the lowest operating cost and the maximum available draw solution range of any FO-Draw Recovery process combination available.

The chemical forced precipitation technology can be paired with other pre-filter technologies. Two that are typically used are UV for bacterial treatment and forward osmosis technology for filtration.

On the post-treatment end of the chemical forced precipitation process; if water quality is not adequate for an industrial application the chemical forced precipitation process can be paired with post treatment enhancements, for example, Electrodionization (EDI) or Deionizing Ion Exchange (IX). reverse osmosis technology.

A description of the chemical forced precipitation methodology provides insights into its unexpected effectiveness as a water treatment process. The following descriptions will identify the differences in the piping and instrumentation scheme for the chemical forced precipitation process as a standalone system and for a chemical forced precipitation system paired with a forward osmosis prefilter. The chemical forced precipitation without forward osmosis will be described first and is based on information in FIG. 3. Then, the chemical forced precipitation with forward osmosis will be described. The chemical forced precipitation & forward osmosis discussion is based in FIG. 4.

Figure 3:
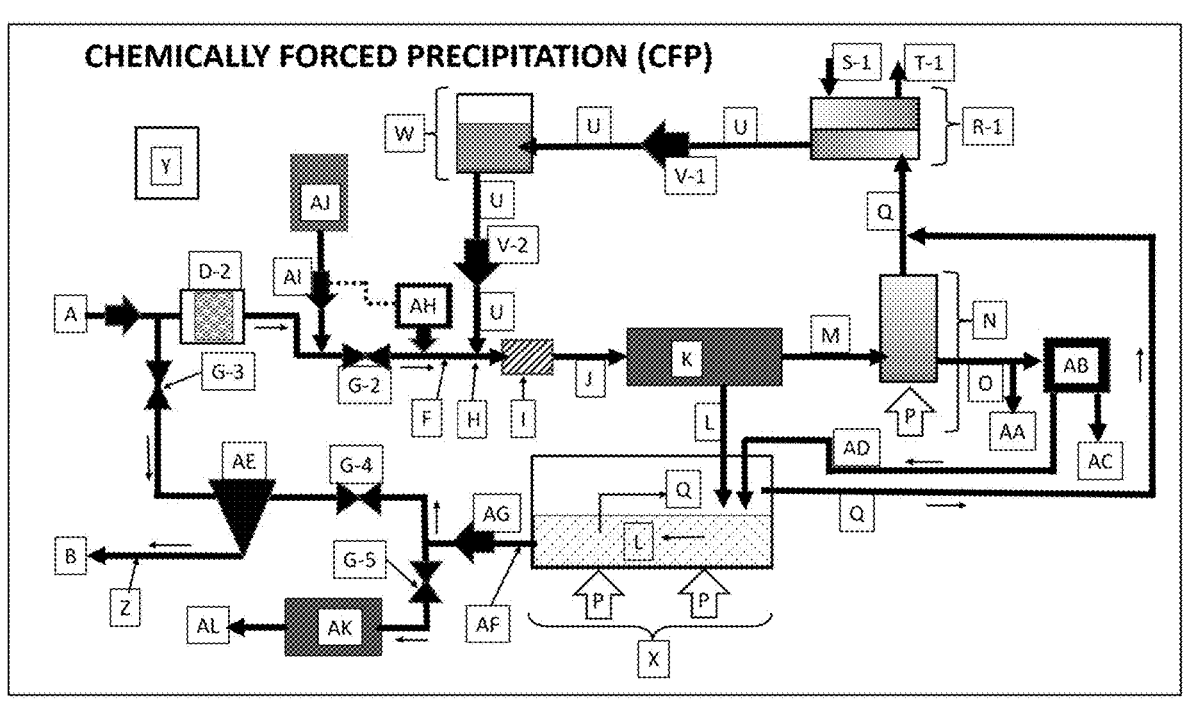
FIG. 3 illustrates an embodiment of the chemical forced precipitation process.
Figure 4:
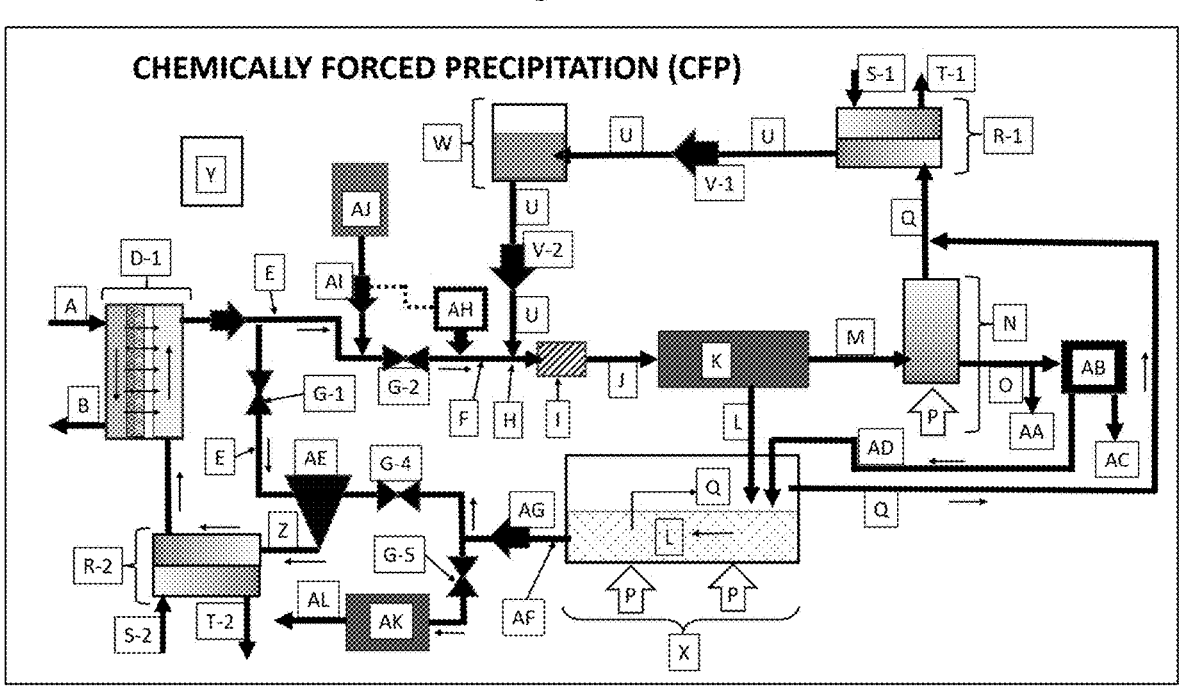
FIG. 4 illustrates an embodiment of the integration of the chemical forced precipitation and forward osmosis processes.

Table 1 provides the symbols and explanations for the processes disclosed in FIGS. 3 and 4.

TABLE 1

| Symbol | Explanation |
| --- | --- |
| A | Untreated process water. Water contaminated with salts and/or hydrocarbons, & other chemicals. |
| B | Treated process water with reduced volume and increased concentration of impurities due to osmotic pressure that causes a migration of clean water through the semi-permeable membrane. |
| C | Semi-permeable membrane. |
| D-1 | Forward osmosis membrane assembly. |
| D-2 | Backwashable filter assembly |
| E | Forward osmosis draw solution diluted with water from the process water source. |
| F | Filtered & pH adjusted process water |
| G-1 | Automated valve working in conjunction with valve "G-2" to apportion liquid flow between the water/salt separation loop and water extraction loop. |
| G-2 | Automated valve working in conjunction with valve "G-1" to apportion liquid flow between the water/salt separation loop and water extraction loop. |
| G-3 | Automated valve working in conjunction with "G-2" to apportion liquid flow between water/salt separation loop and brine slurry dilution loop. |
| G-4 | Automated valve working in conjunction with valve "G-5" to apportion brine slurry (AF) flow between the Venturi mixer (AE) and Dryer (AK). |
| G-5 | Automated valve working in conjunction with valve "G-5" to apportion brine slurry (AF) flow between the Venturi mixer (AE) and Dryer (AK). |
| H | Point of organic solvent injection into brine solution. |
| I | Ultrasonic mixer to combine organic solvent and brine solution. |
| J | Mixed organic solvent & brine. Small salt crystal formation begins immediately after mixing. Ratio of secondary polar solvent to solute and water determines rate of crystal growth. |
| K | Lakos Separator, Centrifuge or equal to separate liquid supernatant from salt precipitate. |
| L | Crystalized salt slurry containing organic solvent. |
| M | Supernatant mixture of water and organic solvent, for example alcohol. |
| N | Solvent heating device/distillation column to distill (evaporate) organic solvent from supernatant mix. |
| O | Permeate (Reclaimed Water) |
| P | Adjustable heating source used only to evaporate organic solvent added to supernatant to produce salt precipitation. |
| Q | Organic solvent vapor. |
| R-1 | Condenser to liquify secondary polar compound vapors. |
| R-2 | Chiller to cool high salt content brine after hot salt has been added. |
| S-1 | Cool liquid inlet. |
| T-1 | Warmer liquid exit. |
| S-2 | Cool liquid inlet. |
| T-2 | Warmer liquid exit. |
| U | Organic Solvent, for example alcohol (liquid). |
| V-1 | Automated liquid organic solvent transfer pump. |
| V-2 | Automated liquid organic solvent injection pump. |
| W | Liquid organic solvent storage tank. |
| X | Solvent Evaporator. Enclosed screw conveyor or other device with controlled heating to evaporate secondary polar solvent. Salt slurry moved by gravity, screw conveyor, or other means from centrifuge or equal, to a point where salt crystals are reconstituted in the brine. |
| Y | PLC based Process Control Center |
| Z | High salt content brine solution. |
| AA | Reclaimed water with 0.05% of original salt content |
| AB | Ultra-pure water treatment. Multi-stage Flash Distillation (MSF), Multi Vapor Compression (MVC), Reverse Osmosis (RO) or similar process |
| AC | Ultra-pure water |
| AD | Salts from (AB) process |
| AE | Venturi liquid-solid mixing (or equal) |
| AF | Brine slurry |
| AG | Brine pump |
| AH | pH meter with transmitter |
| AI | Remotely controlled chemical metering pump |
| AJ | Basic solution. (NaOH for example) |
| AK | Dryer for salt |
| AL | Granular salt |

FIG. 3 illustrates the process flow for chemical forced precipitation without forward osmosis:

All of the following process steps are measured by sensors and regulated by a computer driven software program (Y). First, untreated water enters at (A). Automated valves (G-2) and (G-3) direct the water in two directions. The water's path through (G-2) is preceded by pH adjustment and organic solvent dosing. A metered dosing of an alkaline compound is provided by a remotely controlled chemical metering pump (AI). The metering pump (AI) is regulated by pH sensor (AH) and doses basic solution stored in tank (AJ). A metered dosing of organic solvent is produced with the remotely controlled proportional metering pump (V-2).

Next, the pH adjusted and organic solvent infused process water (F) is then mixed using a static mixer (I). Salt precipitation begins immediately after the organic solvent (U) is added to the mixture. The precipitate (L) is separated from the process water (F) with a vibrating separator, for example a LAKOS® separator, or centrifuge (K).

Next, the supernatant (M) consisting of water and organic solvent is transferred to a solvent heating/distillation column device (N) to evaporate/distill the organic solvent out of the water. The organic solvent (Q) vapors are condensed at a condenser (R-1) and then transferred as a liquid to storage tank (W).

Next, the permeate (reclaimed water) (O) leaving the solvent heater/distillation column (N) has 99.94% of the salt removed when the TDS is above 100,000 mg/L. This efficiency gradually degrades when the TDS is lower. For example, the removal efficiency is approximately 99.9% when water with a TDS of 35,000, for example seawater, is used as the process water (F). The resulting permeate from seawater desalination has a TDS between 30-40 mg/L. This is below the typical 50-150 TDS range for drinking water.

Next, if ultra-pure water is required for a commercial application, then the permeate (O) can be further treated at a system identified as (AB). For example, the (AB) technology could be Multi-stage Flash Distillation (MSF), Multi Vapor Compression (MVC), and Reverse Osmosis (RO). The products of these treatments (AC) vary. The salts (AD) from the (AB) process are routed to the solvent evaporator device (X) where the organic solvent (U) is separated from the crystalized salt slurry (L).

Next. the brine discharge from the vibrating separator, for example a LAKOS® separator, or centrifuge (L) and the ultra-pure water treatment (AD) is routed to the solvent evaporator (X). Organic solvent vapors (Q) leave evaporator (X) and are condensed in heat exchanger (R-1). The resulting liquid organic solvent (U) is then transferred to storage tank (W).

Next, the untreated process water (A) can also be routed through valve (G-3) to the Venturi solid-liquid mixing device (AE). If it is decided the brine should be returned to its source this device is used to dilute the brine slurry (AF) before it is discharged at (B).

Finally, the brine slurry (AF) is pumped (AG) to the Venturi mixer (AE) or to the Dryer (AK). The rate and direction of brine flow is regulated by automated valves (G-4) and (G-5). When the brine (AF) is routed to the Dryer (AK) it is dried and becomes a commercially viable product. The brine that is routed to the Venturi mixer (AE) is used to adjust the TDS of the solution (Z) before it is returned to its source.

FIG. 4 illustrates the process flow for chemical forced precipitation with FO:

All of the following process steps are measured by sensors and regulated by a computer driven software program (Y). First, untreated water enters the forward osmosis Filter Assembly (D-1) at (A) and leaves at (B). While in the forward osmosis assembly, potable water and some salts migrate through the membrane (C), leaving the salts, other contaminants, and water behind.

Next, the permeate/salt mixture made in step 1 above mixes with the forward osmosis draw solution (E) and is pumped (F) into a bifurcated piping system. The flow in each branch is regulated by two computer adjustable automated valves (G-1) & G-2). The flow passing through (G-1) is routed to the Venturi liquid-solid mixer (AE) where it dilutes the brine slurry (AF) as required to reconstitute the high salt content forward osmosis draw solution (Z) which optimizes chemical forced precipitation operation.

Next, the forward osmosis draw solution (Z) is then chilled at Chiller (R-2) before reentering the forward osmosis membrane assembly (D-1).

Next, the diluted forward osmosis draw solution (E) that passes through automated valve (G-2) is pH adjusted by metered dosing of alkaline compounds with a remotely controlled Chemical Metering Pump (AI). The Metering Pump (AI) is regulated by pH Sensor (AH) and doses basic solution stored in Tank (AJ).

Next, an organic solvent (U), for example an alcohol, is introduced into the diluted and pH adjusted forward osmosis draw solution (E) at position (H). The rate of solvent (U) dosing is metered using an Automated injection pump (V-2).

Next, the pH adjusted and organic solvent infused forward osmosis draw solution is then mixed with static mixer (I). Salt precipitation begins immediately after the organic solvent (U) is added to the mixture (E). The precipitate (L) is separated from the forward osmosis draw solution (E) with a vibrating separator, for example a LAKOS® separator, or centrifuge (K). The salts (L) are routed to the solvent evaporator (X).

Next, the supernatant (M) consisting of water and organic solvent is transferred to a Solvent Heating/Distillation Column device (N) to evaporate/distill the organic solvent out of the water. The organic solvent (Q) vapors are condensed at Condenser (R-1) and then transferred as a liquid to Storage Tank (W).

Next, the permeate (reclaimed water)(O) leaving the Solvent Heating/Distillation Column (N) has 99.94% of the salt removed from an forward osmosis draw solution with a TDS of 150,000 mg/L. In this application the TDS of the permeate (O) will be approximately 60. This is well within the typical 50-150 TDS range for drinking water.

Next, if ultra-pure water is required for a commercial application, then the permeate (O) can be further treated, (AB) for example, Multi-stage Flash Distillation (MSF), Multi Vapor Compression (MVC), and in some cases with Reverse Osmosis (RO). The products of these treatments (AC) vary. The salts (AD) from the (AB) process are routed to the Solvent Evaporator (X) where the organic solvent (U) is separated from the crystalline salt slurry (F).

Next, solvent vapors (Q) generated in the Solvent Evaporator (X) are routed to heat exchanger (R-1) where they become liquid organic solvent (U) that is stored in container (W).

Finally, the brine slurry (AF) is pumped (AG) to the Venturi mixer (AE) or to the Dryer (AK). The rate and direction of brine flow is regulated by automated valves (G-4) and (G-5). When the brine (AF) is routed to the Dryer (AK) it is dried and becomes a commercially viable product. The brine that is routed to the Venturi mixer (AE) is used to adjust the TDS of the forward osmosis draw solution (E) as required to optimize the chemical forced precipitation process.

The disclosed technology presented herein is relevant to the objectives and tasks of groups that are focused on enhanced environmental stewardship. The technology provides a cost effective, and environmentally green resource for terrestrial and sea applications of water purification. Not only does this chemical forced precipitation water purification process described herein provide a commercially viable solution for drinking water scarcity around the world, the chemically forced precipitation process also provides commercially viable salts. It is expected that in some applications the salt byproducts will be used as the required chemical consumable for the $CO_2$ capture and repurpose process. The sodium carbonate and sodium bicarbonate byproducts of the $CO_2$ capture and repurpose process have several uses. These include treating ocean acidification, strengthening concrete, and more. When the byproducts are used to treat ocean acidification, a circle is completed. The salts taken from the ocean return to the ocean as other compounds that improve ocean health.

The disclosed chemically forced precipitation technology has been verified through bench scale testing to remove 99.9% of the salts from seawater and brines of similar TDS. The efficiency of the chemical forced precipitation process improves to 99.94% when treating brine with a TDS of 150,000 mg/L, for example, when linked to forward osmosis membrane.

This chemically forced precipitation technology is extremely adaptable and scalable. It can be built into skid sized units that are easily deployed to any location or scaled up to supply water requirements for a community. It can be built into marine vessels to supply water at dramatically lower energy cost than conventional water making technology or installed on land essentially anywhere in the world.

The chemical forced precipitation process is cost effective to operate and ideal for rural locations near the ocean. The ocean's cool water and a solar hot water heater or waste heat from a combustion process will supply all of the heating and cooling requirements of the chemical forced precipitation process. For example, when methanol is used as the organic solvent the heating source must only reach 65° C., a temperature that is dramatically lower than the heat required for other thermal desalinization processes. The ocean with an average temperature of 13.9° C. more than meets cooling required for methanol condensation.

The process control system logic program used with the chemical forced precipitation process has the ability to individually sense and adjust the process parameters as required to optimize water production.

The chemical forced precipitation technology utilized in this process is successfully used as described in U.S. Pat. No. 11,369,918 B2, which utilizes organic solvents to precipitate $Na_2CO_3$, $NaHCO_3$ and other compounds for an entirely different purpose than the water treatment described herein.

Although the previously patented chemical forced precipitation process has similarities to the chemical forced precipitation process used in this patent application, the previously patented process is also dramatically different. The previously patented chemical forced precipitation technology does not have the process refinements included in the chemical forced precipitation process described in this patent. The chemical forced precipitation process description in this patent application includes technology that was not developed at the time of the above referenced patent. For example, the chemical forced precipitation technology presented in this patent includes technology for reclaiming the organic solvents from the salts and simultaneously managing all of chemically forced precipitation process variables using a computer that directs changes through automated valves etc. This the computer program is guided by data from process by sensors at each step of the process sequence. These improvements are identified in narrative that describes FIGS. 3 and 4 and further explained in subsequent text.

The Solvent Evaporator (X) was developed for recovering the organic solvents from the salt slurry (L). The heated screw conveyor or vibrating tray used in this device causes the salt slurry to expose additional surfaces and thereby release the solvents.

The chemical forced precipitation process performance is optimized by control logic that provides unanticipated benefits. This program enhances the production of water in a number of ways:

(1) Contributing to the maintenance of an optimal TDS for chemical forced precipitation by balancing the flow of process water or forward osmosis draw solution and the rate of brine re-entrainment into the process liquid.

(2) When the chemical forced precipitation process is used with forward osmosis membrane technology, the computer program maintains the steady elevated brine TDS that is essential for high water production rate and good water quality.

It was discovered through experimentation that optimized brine TDS requires the simultaneous adjustment of five variables: (1) rate of forward osmosis brine liquid treated with the organic solvent, (2) the pH of the forward osmosis brine that is treated with organic solvent, (3) the rate of forward osmosis brine liquid that is introduced into the Venturi liquid-solid blender, (4) rate of brine slurry introduced into the Venturi liquid-solid blender, (5) process temperature.

The computer program manages the multi-variable relationship by responding to sensors data with adjustments to the chemical forced precipitation process equipment in ways that regulate four of the five parameters simultaneously. The process cannot adjust the input temperature of the untreated water, but it does adjust the temperature of the draw solution within the process. The rates of process change are also proportional and includes algorithms to account for hysteresis.

(3) Contributing to the maintenance of an optimal TDS for chemical forced precipitation by maintaining a balance between the amount of forward osmosis draw solution (E) introduced into the precipitation process with the amount of permeate (O) leaving the process. This simple balance is maintained independently of the five variable equilibrium described above.

While the inventive features have been particularly shown and described with reference to embodiments thereof, it will be understood by those in the art that the foregoing and other changes may be made therein without departing from the sprit and the scope of the disclosure. Likewise, the various diagrams may depict an example architectural or other configuration for the disclosure, which is done to aid in understanding the features and functionality that may be included in the disclosure. The disclosure is not restricted to the illustrated example architectures or configurations but may be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead may be applied alone or in some combination, to one or more of the other embodiments of the disclosure, whether or not such embodiments are described, and whether or not such features are presented as being a part of a described embodiment. Thus, the breadth and scope of the present disclosure should not be limited by any of the above-described exemplary embodiments.

What is claimed is:

1. A method of chemically precipitating salts from an aqueous solution at concentrations within their solubility range using an organic solvent without a forward osmosis membrane, comprising the steps of:
    a) regulating a process water flow to equal a rate of reclaimed water leaving the process;
    b) filtering the process water to remove biological materials;

c) adjusting the process water pH, as required, to about pH 9;

d) injecting an organic solvent, that does not form an azeotrope with water, into the process water;

e) optimizing precipitation of the salts by mixing the process water and the organic solvent with an ultrasonic mixer to form the precipitated salts;

f) separating the precipitated salts from supernatant liquid using a vibrating separator or centrifuge, and routing organic solvent vapors from a solvent heating device/ distillation column to a first condenser, and when liquid organic solvent forms, routing it to a storage container;

g) using a solvent evaporator to agitate the precipitated salts to aid release of the liquid organic solvent;

h) routing the organic solvent vapors to the first condenser, and when the vapors becomes liquid, routing it the liquid to a storage container; and i) routing the precipitated salts either to a mixer to re-introduce the salts into the process water before being discharged back into its source or routing the precipitated salts to a dryer in preparation for resale.

2. The method of claim 1, wherein the organic solvent is methanol, or other organic solvent that does not form azeotropes with water.

3. The method of claim 1, wherein salt is separated from an aqueous liquor using an organic solvent.

4. The method of claim 1, wherein the organic solvent is reclaimed from the precipitated salts using mechanical agitation and heat.

5. The method of claim 1, wherein a chemical forced precipitation process is coupled to a forward osmosis membrane, the rate of chemical forced precipitation is regulated by maintaining the concentration of salt in the forward osmosis draw solution with the simultaneous adjustment of five variables:

a) rate of forward osmosis brine liquid treated with the organic solvent, b) the pH of the forward osmosis brine that is treated with organic solvent, c) the rate of forward osmosis brine liquid that is introduced into a Venturi liquid-solid blender, d) rate of brine slurry introduced into a Venturi liquid-solid blender, and e) the temperature of the forward osmosis draw solution temperature.

6. The method of claim 1, wherein a rate of chemical forced precipitation is maintained by maintaining a balance between the amount of water introduced into a forward osmosis draw solution is balancing an amount of permeate (O) leaving the process.

* * * * *